United States Patent [19]

Wyss

[11] 3,977,606
[45] Aug. 31, 1976

[54] DIFFUSER DEVICE

[76] Inventor: Robert J. Wyss, 5858 N. Main St., Dayton, Ohio 45405

[22] Filed: May 5, 1975

[21] Appl. No.: 574,326

[52] U.S. Cl. ................................ 239/145; 239/534; 239/547; 261/122
[51] Int. Cl.² ...................... A01G 27/00; B05B 1/30
[58] Field of Search ................ 239/34, 58, 145, 55, 239/602, 547, 534; 261/65, 122; 210/220, 356

[56] References Cited
UNITED STATES PATENTS

| | | | |
|---|---|---|---|
| 1,187,533 | 6/1916 | Keyrouse | 239/58 |
| 2,771,320 | 11/1956 | Korwin | 239/534 |
| 3,186,644 | 6/1965 | Ross et al. | 239/534 |
| 3,293,861 | 12/1966 | Hinde | 239/534 |
| 3,642,260 | 2/1972 | Danjes et al. | 261/122 |
| 3,677,936 | 7/1972 | Bastiaanse | 239/534 |
| 3,857,910 | 12/1974 | Day | 239/145 |
| 3,880,965 | 4/1975 | Dudis et al. | 239/145 |

FOREIGN PATENTS OR APPLICATIONS

| | | | |
|---|---|---|---|
| 558,462 | 9/1932 | Germany | 261/122 |
| 638,185 | 5/1950 | United Kingdom | 261/122 |

Primary Examiner—Robert S. Ward, Jr.
Attorney, Agent, or Firm—Jerome P. Bloom

[57] ABSTRACT

A diffuser device for use in disseminating air or other gaseous fluid under pressure characterized by wall structure at least a portion of which is formed of impermeable material having a multitude of normally sealed microscopic ruptures. Said wall structure, at least in the area of said ruptures, is characterized by the ability to flex when the interior wall surface thereof, which defines the diffuser chamber, is filled with air or other gaseous fluid under a predetermined level of pressure. Said ruptures are so designed that as long as the required air pressure is maintained they form a multitude of jet-like flow passages each of which has an exceedingly small diameter. Consequently, as long as the pressure level is maintained, the air will move from the diffuser chamber, by way of said microscopic ruptures, in the form of a multitude of very fine, relatively minute, air jets which on entry to a surrounding body of liquid, for example, will form air bubbles which are correspondingly of extremely small, relatively micro-miniature size. The material of the diffuser wall structure is such that, when the air pressure falls below the required level, the microscopic ruptures will automatically reseal.

Preferred embodiments of the invention are distinguished by the diffuser wall structure being comprised in part by an integrated frame the respective end portions of which form end walls and are spaced by a relatively narrow integrally connected strip which is apertured and has a trough-like form.

9 Claims, 5 Drawing Figures

U.S. Patent  Aug. 31, 1976  3,977,606
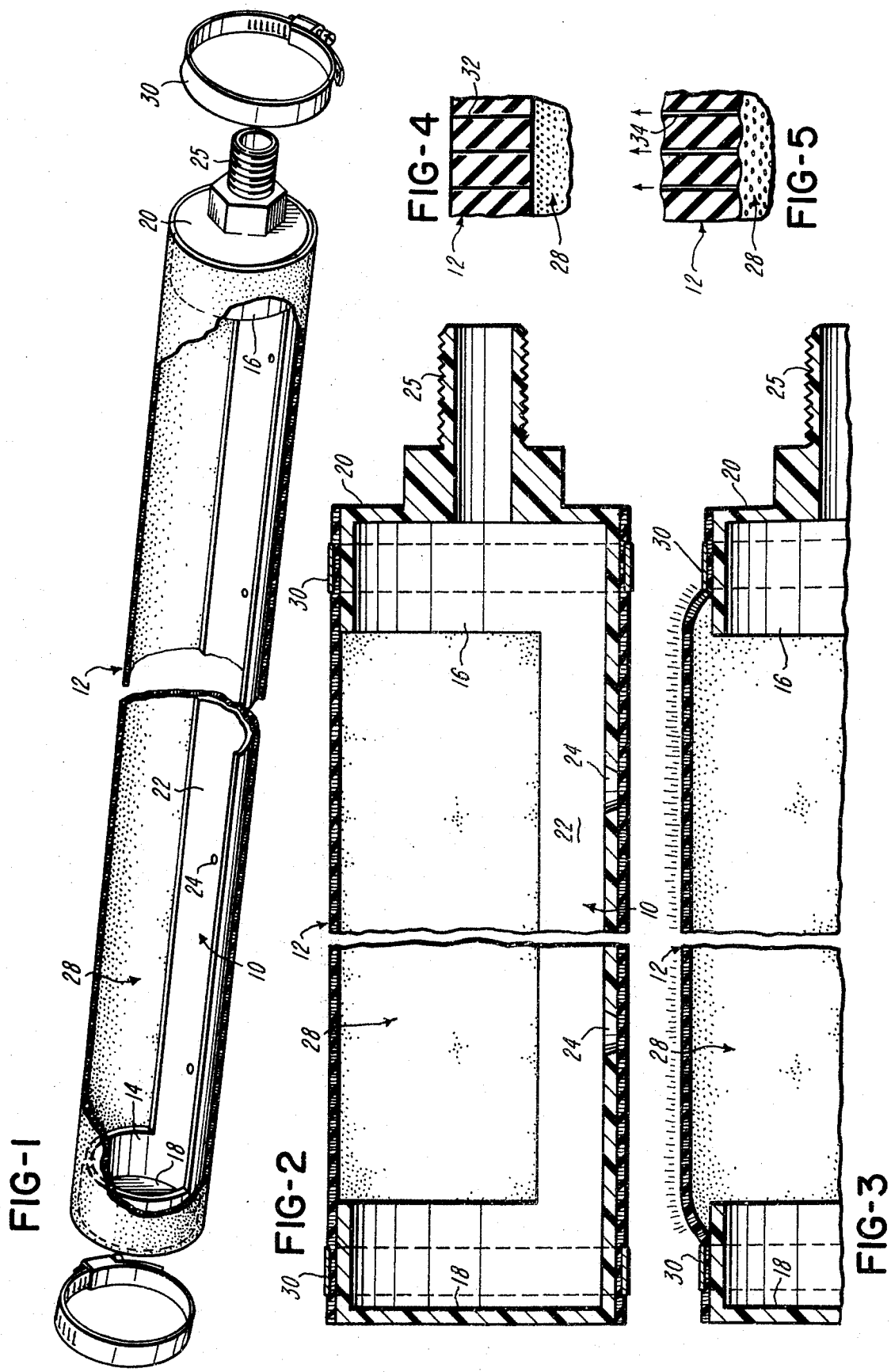

DIFFUSER DEVICE

BACKGROUND OF THE INVENTION

This invention relates to improvements in diffusers, embodiments of which, while not so limited, have a particularly advantageous application to the treatment of sewage.

The diverse nature and character of the various designs for air diffusers of the prior art is indicative of the continuing existence of problems in application of such devices. Examples of the prior art are shown in United States Letters Patent identified as follows:

| | | |
|---|---|---|
| L. Coleman | 2,250,295 | July 22, 1941 |
| C. E. Ford | 2,294,973 | Sept. 8, 1942 |
| J. W. Van Denburg | 2,430,749 | Nov. 11, 1947 |
| M. A. Lamb | 2,815,943 | Dec. 10, 1957 |
| D. S. Ross et al | 3,186,644 | June 1, 1965 |
| R. J. Klingbeil et al | 3,315,895 | April 25, 1967 |
| S. G. Y. Garner | 3,416,776 | Dec. 17, 1968 |
| R. J. Good | 3,441,216 | April 29, 1969 |
| Carl Dummann | 3,626,500 | Dec. 7, 1971 |
| Lois I. Day | 3,857,910 | Dec. 31, 1974 |

One of the primary problems found in the use of prior art diffusers is the rapid disabling of the diffuser structures by reason of clogging of the pores and the growth of bacteria over their operating surfaces in a relatively short period of time. Further, by reason of the inefficient construction of diffuser wall structures, the passages which they provide for the distribution of air to a surrounding body of liquid sewage dictate that the escaping air forms air bubbles which are too large to enable its effective distribution or ready penetration of clustered groups of solids. This materially affects the ability of the diffuser to distribute the air or the oxygen therein in a sufficiently effective manner to control odor and to properly condition the sewage content as desired. Additionally, in the prior art diffuser concepts there is only a limited area of the wall surface of the diffusers through which air may pass. This also contributes to a relatively inefficient oxygenating function of the diffuser. The design of some prior art diffusers tends also to cause hang up of debris, interfering further with the effective flow of air from the diffuser.

The foregoing are but some of the problems which the present invention has solved.

SUMMARY OF THE INVENTION

The present invention provides a most simplified diffuser structure including a frame which in a preferred construction consists of end portions, forming end wall portions of the diffuser, which are longitudinally spaced by an integrally connected apertured strip which has a trough-like configuration. Peripherally encompassing this frame is a relatively thin, impermeable, relatively flexible rubber-like material. The composite of the frame and the peripherally encompassing material forms a diffuser chamber an inlet to which is defined by means in connection with one end portion of the frame and potential outlets from which are inherently provided by a multitude of microscopic ruptures in the aforementioned flexible material which forms the peripheral wall portion of the diffuser. The ruptures are applied to the rubber-like material by the direct application of a multitude of extremely fine needles which are passed through the material substantially perpendicular to its respective inner and outer surfaces.

The preferred embodiment of the invention described provides that on the introduction thereto and filling thereof by air under a predetermined pressure the normally impermeable flexible material of its wall structure will flex outwardly, particularly in the area of each of its microscopic ruptures. The boundaries of each rupture, having elastic characteristics, will be caused thereby to form flow passages which have an extremely small diameter. The net result is that the air will escape from the diffuser in the form of very fine jet-like streams. By reason of the nature and direction of the ruptures, the streams will have an essentially direct radial flow path. This together with the micro-miniature dimension of the jet-like streams dictates that on entry thereof into a surrounding body of fluid they will produce a multitude of extremely small, micro-miniature sized air bubbles capable of effectively penetrating clumps of sewage solids which they encounter. Within the rubber-like material which encompasses the frame, the trough-like strip portion of the frame has a dual function in that it serves to collect and provide a directed drain of condensate which may form interiorly of the diffuser chamber.

It is accordingly a primary object of the invention to provide an improved diffuser construction which is not only economical to fabricate but more efficient and satisfactory in use, adaptable to a wide variety of applications and unlikely to malfunction.

Another object of the invention is to provide a diffuser construction the peripheral wall of which is formed by impermeable material, in at least a portion of which are formed microscopic ruptures which are normally sealed but capable, upon application of air under predetermined level of pressure interiorly of the diffuser, to form extremely small, micro-sized jet-like flow passages.

A further object of the invention is to provide a diffuser structure capable of disseminating air into a surrounding body of liquid in a manner to produce in the liquid a multitude of micro-miniature air bubbles lending themselves to more effective distribution and application of the applied air.

An additional object of the invention is to provide improvements in frame structures applied in the construction of diffuser units.

Another object of the invention is to provide an improved diffuser unit characterized by substantially the entire periphery thereof being provided with normally sealed relatively microscopic ruptures enabling the substantially complete function of the peripheral wall of the diffuser as an air distributing medium.

A further object of the invention is to provide diffuser units possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein is shown one but not necessarily the only form of embodiment of the invention, FIG. 1 of the drawings illustrates a partially exploded view of a preferred embodiment of the invention, broken away, in part, to illustrate the characteristics of its various components;

FIG. 2 is a longitudinal sectional view of the assembly shown in FIG. 1;

FIG. 3 is a fragmentary view of the structure shown in FIG. 2, illustrating, on a magnified scale, the expansion of portions of the diffuser wall structure under the influence of internally applied air under a predetermined level of pressure;

FIG. 4 is an enlarged fragment of the peripheral wall structure of the diffuser of FIGS. 1-3 illustrating that portion of the peripheral wall structure which embodies microscopic ruptures which are normally sealed; and FIG. 5 is a view similar to that shown in FIG. 4 revealing the condition of the normally sealed microscopic ruptures under the influence of air applied to the surrounding wall structure under a predetermined level of pressure.

Like parts are indicated by similar characters of reference throughout the several views.

DESCRIPTION OF THE ILLUSTRATED EMBODIMENT OF THE INVENTION

The diffuser shown in the drawings includes a frame 10 peripherally encompassed by a flexible sheetlike structure 12. The latter may be applied as shown or in the form of a tubular sleeve.

The frame 10 is an integrally formed structure including relatively narrow, cylindrically shaped tubular end portions 14 and 16 the remote ends of which are capped by integrally formed disc-like closure plates respectively identified by the numerals 18 and 20. Integrally connected with and maintaining a longitudinally spaced relation of the frame portions 14 and 16 is an elongate strip portion 22. The latter has a trough-shaped configuration and the base of the trough is provided with a series of longitudinally spaced apertures 24. As may be seen from FIG. 1 of the drawings, in the normal disposition thereof in use, the strip portion 22 is so disposed to form the bottom portion of the frame 10. Formed integral and projected outwardly from the disc portion 20 to one end of the frame 10 is an adapter 25 suitably configured to form an inlet to the diffuser chamber 26 defined by the frame 10 and the material forming its peripherally encompassing wall structure 12.

In accordance with the invention, it is essential that the sheet-like structure 12 be formed of a suitable material having physical characteristics such as provided by a synthetic rubber, such as Buna N. In the preparation of such material for the application described, whether the material be applied in sheet or tube form, the material is punctured to produce therein several thousand microscopic ruptures. In practice these ruptures are effected by application of needles of extremely small cross sectional dimension which upon withdrawal from the material leave no perceptible evidence of their penetration. What actually occurs is that when the needles are withdrawn, due to the extremely small diameter of the needles and the inherent characteristics of the synthetic rubber, the material 12 will self seal the perforations which were imposed by the needles. Thus, while the sheet or tubular material 12 which forms the peripherally encompassing wall structure of the illustrated diffuser is basically formed with thousands of microscopic ruptures, it will nevertheless be impermeable until the interior wall surface thereof is subjected to a predetermined level of pressure which will make the material 12, about the respective microscopic ruptures, stretch to produce thereby as a maximum, jet-like flow passages of extremely small diameter.

It is noted that the frame 10 may be made of any rigid self-supporting material such as polypropylene.

In the embodiment illustrated, the material forming the sheet-like structure 12 peripherally encompasses the frame 10 to have the same stretched from end to end of the frame. The portions of the sheet material 12 about the end portions 14 and 16 of the frame are peripherally encompassed and clamped to the end portions of the frame by conventional band-type clamps 30.

In an illustrative use of the extremely simple diffuser structure described, the adapter portion 25 which defines the inlet passage to the diffuser chamber 28 is suitably coupled to a source of air under pressure and, so coupled, positioned in an intermediate portion of a body of liquid sewage to serve its intended function. The natural and inherent rigidity of the frame portion 10 insures that the diffuser will remain in its established position as air under pressure is supplied to the chamber 28. As the air fills the chamber 28 and is applied to the interior wall of the peripherally encompassing wall structure of the diffuser at the required pressure level (determined by the nature of the material 12 and the ruptures incorporated therein), the normally sealed ruptures, identified in FIG. 4 by the numeral 32, will form extremely small diameter passages 34 (seen in FIG. 5). This result is due to the fact that in the area of each rupture 32 the wall structure 12 is sufficiently weakened that the portions of the material bounding the rupture will flex outwardly under the influence of the prescribed air pressure, to form in the process a passage having a micro-sized diameter. Note must be taken that the punctures are so effected that these micro-sized diameter passages are arranged substantially perpendicular to the respectively opposite faces of the material 12 (See FIGS. 3, 4 and 5). This dictates that the air which has filled the chamber 28 will now have outlets through which to escape to the surrounding liquid sewage in an essentially radial flow pattern. By reason of the multitude of the ruptures the flow pattern will be essentially in peripherally encompassing and generally coextensive relation to the outer surface of the material 12. Inherently, the very small diameter of the passages now defined in the areas of the material 12 in which the microscopic ruptures were formed will insure that the air escapes in fine needle-like jets. The consequent result is that the escaping air will, in encountering the surrounding liquid, produce extremely small, relatively micro-miniature sized, bubbles. The needle-like form and direction of the jets produced is such, moreover, that the small bubbles formed thereby will readily move to and into the sewage solids embodied in the surrounding liquid. This insures a highly effective distribution of the air and its oxygen content enabling it to much more effectively work against odors and towards a safe and sanitary reduction of the sewage than has normally heretofore been possible. It will be seen that the creation of the extremely small diameter jet-like flow passages 34 is enabled only by reason of the basic elasticity of the material of which the wall structure 12 is formed. Of course, this elasticity is limited and insures that when the air in the chamber 28 falls below the required pressure level that the material will self-seal in the area of the microscopic ruptures.

The whole simple construction of the described embodiments of the invention is such that it is obviously extremely economical to fabricate. Moreover, due to the efficiency of the diffuser of the construction described, it is much more economical to use, particularly since the power required for its operation is approximately half that required for the prior art conventional diffusers.

Further advantages of the invention construction are evidenced by the fact that not only is the material 12 forming the peripherally encompassing wall structure of the diffuser of an impermeable nature and normally self-sealed except under conditions dictating a diffusing operation, but the extremely small diameter apertures which are created in the diffusing operation essentially preclude inadvertent back flow during operation. This is insured by the very fine jets of air which issue from the diffuser wall 12 at relatively high velocity. Of course, when air fails there is an automatic self-sealing operation precluding inflow of water to the chamber 28.

The provision of the frame portion 22, moreover, provides an area at the bottom of the diffuser in which condensate may collect and through the medium of the apertures 24 be evacuated through the wall structure 12, continuously during the operation of the diffuser. It will be seen, of course, that substantially the entire expanse of the wall structure 12 functions to pass air jets when required. This substantially 360° capability is quite distinct from the capabilities of prior art structure. In the past it has been felt that a diffuser could only function efficiently with apertures or bores in the upper half thereof.

Even more benefits may be seen from the structure of the invention. The material of which the diffuser is formed as here contemplated will inherently preclude the growth thereon of sewage bacteria. Moreover, the characteristics of the material employed is such that it requires essentially no maintenance and has, therefore, a long and most effective operating life. It is self-evident, of course, that the design of the invention embodiments preclude debris hang up and interference thereby of its effective operation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A diffuser device comprising a frame including end portions longitudinally spaced apart by and interconnected to the respective extremities of rigidifying strip means which function therewith to determine the configuration of said frame, an elastomeric material peripherally encompassing said frame and defining therewith an interior diffuser chamber, said material being provided, throughout the extent thereof, with a multitude of extremely fine punctures producing therein microscopic ruptures so minute as to be self-sealing and generally imperceptible in the absence of an interior pressure in said chamber sufficient to stretch the elastomeric material about microscopic ruptures, and means defining an inlet to said diffuser device for directing fluid under pressure to the interior of said chamber to be diffused through microscopic ruptures in said material stretched under the influence of the pressure thereof, whereby to provide that said fluid under pressure will issue from said diffuser device in the form of fine needle-like jets.

2. A diffuser device according to claim 1 characterized in that the punctures in said material extend essentially perpendicular to the respective inner and outer surfaces thereof and are provided in said material in a pattern enabling that said fluid under pressure may, under an appropriate level of pressure, issue from said chamber in the form of a plurality of generally radially directed needle-like jets which are in essentially peripherally encompassing relation to said diffuser device.

3. A diffuser device as in claim 1 characterized in that said strip means is a relatively narrow strip portion of said frame which defines a lower part of said frame and said end portions have a cap-like configuration.

4. A diffuser device according to claim 1 characterized in that said end portions of said frame are cap-like in character and generally cylindrical in configuration, said elastomeric material forms a sleeve encompassing said frame the respective ends of which seat peripheral to said end portions and said interconnecting strip means is a narrow elongate strip portion of said frame the cross section of which is arcuate in configuration and the respective ends of which intercept relatively narrow arcuate segments of the said cap-like end portions of said frame.

5. A diffuser device according to claim 4 characterized in that said strip means and said end portions of said frame with which said strip means connect is an integral structure and said strip means defines the bottom portion of the frame and has the form of a trough designed to collect condensate formed interiorly of said diffuser device in the operation thereof.

6. A diffuser device according to claim 1 characterized in that said elastomeric material has a sleeve-like form, extends from one end portion to the other of said frame and has means applied thereto for the releasable sealing engagement thereof to said end portions.

7. A diffuser device comprising a frame including end portions the peripheral configuration of which determines the general peripheral configuration of said diffuser device, said end portions being interconnected and longitudinally spaced by strip means defining a limited wall portion of said frame intermediate said end portions, a basically impermeable material encompassing said frame and normally defining a non-porous wall structure defining a seal about said frame, said impermeable material being provided with a multitude of punctures the nature of which is to produce microscopic ruptures in said material which are normally imperceptible, the size and character of said ruptures and the nature of said impermeable material being such to provide that the material self-seals in the area of said ruptures absent application to the inner surface thereof of air or other fluid under a predetermined level of pressure, in the presence of which said predetermined level of pressure said ruptures are designed to stretch to allow the fluid to escape from the diffuser by way of said multitude of ruptures in a multitude of extremely fine needle-like jets, said frame and said impermeable material being arranged to define an interior diffuser chamber, and means included to define an inlet to said chamber, which is otherwise sealed, enabling thereby that said fluid may be applied interiorly of said diffuser chamber under said predetermined level of pressure.

8. A diffuser device according to claim 7 characterized in that said frame end portions are ring-like in character, said strip means has a narrow elongate form and is limited to position to the bottom of said frame.

9. A diffuser device according to claim 8 characterized in that said strip means has a trough-like configuration to catch condensate formed interiorly of said chamber in the operation of said diffuser device and includes apertures for passing said condensation to and through the ruptures provided in said impermeable material under the influence of fluid applied interiorly of said diffuser device under said predetermined level of pressure.

* * * * *